United States Patent [19]
Dwyer et al.

[11] Patent Number: 4,624,970

[45] Date of Patent: Nov. 25, 1986

[54] FOAMING SYSTEM FOR RIGID URETHANE AND ISOCYANURATE FOAMS BASED ON POLYETHERS AND AROMATIC POLYESTER POLYOLS

[75] Inventors: Frank J. Dwyer, Buffalo; Leon M. Zwolinski, Orchard Park, both of N.Y.

[73] Assignee: Allied Corporation, Morris Township, Morris County, N.J.

[21] Appl. No.: 734,528

[22] Filed: May 16, 1985

[51] Int. Cl.[4] .................. C08G 18/14; C08G 18/42; C08G 18/76; C08G 18/48
[52] U.S. Cl. ................................ 521/131; 521/127; 521/129; 521/173; 252/182
[58] Field of Search ............... 521/131, 173; 252/182

[56] References Cited

U.S. PATENT DOCUMENTS

| | | | |
|---|---|---|---|
| 4,048,104 | 9/1977 | Svoboda et al. | 260/2.5 |
| 4,076,644 | 2/1978 | Burt et al. | 252/182 |
| 4,177,332 | 12/1979 | Mitschke et al. | 521/131 |
| 4,223,068 | 9/1980 | Carlstrom et al. | 428/310 |
| 4,417,001 | 11/1983 | Svoboda et al. | 521/114 |
| 4,529,744 | 7/1985 | Wood | 521/131 |

*Primary Examiner*—Herbert S. Cockeram
*Attorney, Agent, or Firm*—Jay P. Friedenson; Patrick L. Henry

[57] ABSTRACT

Improved fluorocarbon blowing agents composed of blends of (a) CFC-11, trichlorofluoromethane, with (b) CFC-123 or CFC-123a, dichlorotrifluoroethane, have been found which impart significant improvement in the solubility characteristics of rigid urethane foam systems that contain significant amounts of aromatic polyester polyols. A substantial increase in the solubility of the CFC-11/CFC-123 or CFC-11/CFC-123a blends over CFC-11 alone in typical rigid urethane foam premix systems containing variable concentrations or aromatic polyester polyol is obtained. Preparation of rigid urethane foams have shown that improved solubility CFC-11 blends with CFC-123 or CFC-123a permit an increase in the amount of aromatic polyester polyol than can be used in the formulation without any significant differences in the physical characteristics of foams compared to those produced from CFC-11 without inclusion of aromatic polyester polyols.

10 Claims, No Drawings

FOAMING SYSTEM FOR RIGID URETHANE AND ISOCYANURATE FOAMS BASED ON POLYETHERS AND AROMATIC POLYESTER POLYOLS

DESCRIPTION

This invention relates to improved rigid urethane foam systems and more particularly to an improved blowing system comprising fluorocarbon blowing agents composed of blends of trichlorofluoromethane (CFC-11) with dichlorotrifluoroethane (CFC-123 or CFC-123a position isomers of dichlorotrifluoroethane) which impart significant improvement in the solubility characteristics of rigid urethane foam systems containing aromatic polyester polyols. The improved solubility characteristics of the rigid urethane foam systems permit a relative increase in the amount of low-cost aromatic polyester polyols used in the formulation.

BACKGROUND OF THE INVENTION

Rigid urethane foams are employed in a variety of uses such as insulation applications, for example: roofing systems, building panels, refrigerators and freezers insulation are typical uses. These foams are generally produced from two component chemical systems. Once component, i.e. "premix" is composed of a rigid urethane polyol, a fluorocarbon blowing agent, e.g. a stabilized grade of trichlorofluoromethane (CFC-11); an amine and/or tin catalyst, a surfactant and possibly a fire retardant additive. The other component of the foamable composition is an isocyanate such as pure or crude toluene diisocyanate or a polymeric diisocyanate.

In recent years, aromatic polyester polyols derived from polycarbomethoxy substituted diphenyls, polyphenyls and benzyl esters of the toluate family, were introduced for use in rigid urethane foam systems as substitutes for a portion of the conventional rigid urethane foam polyols used in the system. These reactive hydroxyl-containing materials which comprise aromatic polyester polyols that may be derived, for example, from discarded recycle material, e.g. emptied containers such as polyester soda pop bottles, or from photographic film, impart the following advantageous characteristics to the resultant rigid urethane foams into which such polyols are incorporated:

lower formulation costs
improved compressive strength properties
enhanced flame retardancy
increased use-service temperature of low-density foams.

One of the disadvantages which results in the use of these aromatic polyester polyols in rigid urethane foam systems, however, is a decrease in the compatibility or solubility of the fluorocarbon blowing agent, trichlorofluoromethane, CFC-11, in the system. The presence of fluorocarbon solubility in the system is important for at least the following reasons:

(a) to insure metering of stoichiometric correct amounts of two component systems on commercial foam production equipment; and
(b) to increase the amount of fluorocarbon blowing agent in the closed-cell structure of resultant rigid urethane foams to produce optimum insulation properties.

While a variety of chlorofluoroalkane blowing agents have been used for urethane systems in the past, none of the known systems which have been employed heretofore have been satisfactory for the production of composite rigid urethane foams that includes therein these aromatic polyester polyols.

In rigid urethane foam systems, if the fluorocarbon blowing agent is not completely soluble or miscible in the "premix" component of the system, the insoluble portion of the fluorocarbon will separate as a specific layer on the bottom of the "premix" component container during storage. When the "premix" component container, e.g. 55 gallon drum is put into use for rigid foam production, processing and foam appearance and physical property problems could arise because the "premix" component is not homogeneous. The stoichiometric amount of "premix" component required to react with a specific unit weight of isocyanate would be disproportional and the above indicated processing drawback in appearance and physical property problems could ensue.

Fluorocarbons as a class of insulating gases exhibit the lowest thermal conductivity values when compared to other gases such as air, nitrogen, carbon dioxide, water vapor, etc. In rigid urethane foams systems, fluorocarbons not only act as blowing agents to produce the foam by virtue of their volatility, but also are encapsulated or entrained in the closed cell structure of the rigid foam and are the major contributor to the low thermal conductivity properties of rigid urethane foams used in insulation applications.

If the required amount of fluorocarbon is not present in the resultant rigid urethane foam due to insolubility of some of the fluorocarbon in the "premix" component of the liquid foam system, i.e. nonhomogeneous "premix" component, then the processing characteristics of the foam system will change and desired foam appearance and physical properties, e.g. density, loadbearing, thermal conductivity, etc. wouold not be achieved. Therefore, it is necessary for the fluorocarbon to be completely soluble or miscible in the "premix" component of the liquid foam system in order to obtain the desired results.

Accordingly, a need exists for an improved blowing agent for rigid urethane systems containing aromatic polyester polyols which have the desired solubility, compatibility and stability and which does not adversely affect the resultant rigid foam properties.

SUMMARY OF THE INVENTION

In accordance with the invention, rigid urethane and isocyanurate foams based on conventional polyethers and aromatic polyester polyols are prepared using blends of (a) trichlorofluoromethane (CFC-11) and (B) dichlorotrifluoroethane (CFC-123 or CFC-123a). The desired ratio of CFC-123 or CFC-123a to CFC-11 is preferably in the range of 1:9 to 3:7, respectively and the total blowing agent blend is present in amounts of about 2 to 40 parts by weight based on the total weight of the polyol. Chemicals systems using this blowing agent blend exhibit improved solubility characteristics with no significant adverse effect on resultant rigid foam properties. We have found that this particular fluorocarbon blowing agent blend imparts significant improvement in the solubility characteristics of rigid urethane foam systems containing aromatic polyester polyols. The increased solubility of the CFC-11/CFC-123 or CFC-11/CFC-123a blowing agent blends over CFC-11 alone in typical rigid urethane foam premix systems containing variable concentrations of aromatic polyester polyol, has been found to be substantial. Preparation of rigid urethane foams using the system of the invention has shown that improved solubility of CFC-11 blends with CFC-123 or CFC-123a permits an important increase in the amount of aromatic polyester polyol that can be used in the formulation without imparting any significant adverse properties to physical characteristics of foams produced from CFC-11 over these foams which do not contain the aromatic polyester polyols. The blowing agent blend of the invention improves the solubility and compatibility characteristics of CFC-11 expanded insulation foams produced from premixes that contain aromatic polyester polyols. The foam systems which contain a significant proportion of aromatic polyester polyol have recently emerged as substitutes for conventional polyols used in rigid urethane systems that would not otherwise contain polyester polyols. Those compositions which contain aromatic polyester polyols impart the following desirable characteristics to rigid urethane foams: lower formulation costs, improved compressive strength properties, enhanced flame retardancy, and increased use-service temperature of low-density foams.

DESCRIPTION OF THE PREFERRED EMBODIMENT

In accordance with the invention, rigid urethane foam systems containing aromatic polyester polyols may be compounded with fluorocarbon blowing agent that comprise a blend of (a) CFC-11 and (b) CFC-123 or CFC-123a, to yield improved compatibility and solubility properties to the foamable composition. Advantageously, such properties are retained over long term storage periods. Additionally, an important aspect of the invention resides in the fact that the particular blowing agent system herein described permits an increase in the amount of low cost aromatic polyester polyols that can be introduced into the rigid urethane foam formulations with no significant effect on fluorocarbon compatibility in the system.

The composition of the fluorocarbon blends may vary from about 80–95% of CFC-11 and 5–20% of CFC-123 or CFC-123a based on the equivalency of the amount of CFC-11 normally used in the fomulation. For example, substitution of a 95/5 blend of CFC-11/CFC-123 for CFC-11 in a rigid urethane foam system containing 40% of the aromatic polyester polyol as part of the polyol, resulted in complete fluorocarbon solubility, whereas the system containing the CFC-11 alone exhibited only 90% fluorocarbon solubility. No significant differences in resultant rigid urethane foam reactivity, appearance or physical properties were observed between foam prepared from CFC-11 and the 95/5 blend of CFC-11/CFC-123.

Similarly, the substitution of a 90/10 blend of CFC-11/CFC-123a for CFC-11 in a rigid foam formulation containing 50% of an aromatic polyester polyol such as that available commercially as Terate 203 from Hercules, Inc., as part of the polyol, resulted in complete fluorocarbon solubility where the same system containing CFC-11 exhibited only 85% fluorocarbon solubility. Again, no significant differences in reactivity, appearance or physical properties were observed between foams produced from CFC-11 or the 90/10 blend of CFC-11/CFC-123a.

The use of the specified blends of CFC-11 with CFC-123 or CFC-123a results in improved fluorocarbon compatibility or solubility in rigid urethane foam systems containing aromatic polyester polyols, with no significant effect on resultant rigid urethane foam properties.

The invention is further illustrated by the following specific examples in which parts or percentages are by weight unless stated otherwise.

EXAMPLE I

CFC-11 solubility was determined in a typical free-rise rigid urethane foam premix component containing variable concentrations of the aromatic polyester polyol, Terate 203.

Samples of premix component containing CFC-11 were placed in calibrated glass vials, stored for one month at 70° F. and fluorocarbon solubility determined from the amount of fluorocarbon phase separation of the end of the storage period. Data for this example is set forth in Table I.

TABLE I

| GENETRON ® 11SBA SOLUBILITY IN A RIGID URETHANE FOAM PREMIX CONTAINING AROMATIC POLYESTER POLYOL | | | | | | | | | | |
|---|---|---|---|---|---|---|---|---|---|---|
| Systems | A | B | C | D | E | F | G | H | I | J |
| Pluracol[1] 879 (415-OH#) | 100 | 90 | 80 | 70 | 60 | 50 | 40 | 30 | 20 | 10 |
| Terate[2] 203 (315-OH#) | — | 10 | 20 | 30 | 40 | 50 | 60 | 70 | 80 | 90 |
| Silicone[3] L-5340 | 1.5 | 1.5 | 1.5 | 1.5 | 1.5 | 1.5 | 1.5 | 1.5 | 1.5 | Non |
| Thancat[4] TD-33 | 0.5 | 0.5 | 0.5 | 0.5 | 0.5 | 0.5 | 0.5 | 0.5 | 0.5 | Uni- |
| Thancat[5] DME | 0.2 | 0.2 | 0.2 | 0.2 | 0.2 | 0.2 | 0.2 | 0.2 | 0.2 | form |
| Catalyst[6] T-12 | 0.1 | 0.1 | 0.1 | 0.1 | 0.1 | 0.1 | 0.1 | 0.1 | 0.1 | — |
| Genetron[7] 11SBA | 35 | 35 | 35 | 35 | 35 | 35 | 35 | 35 | 35 | |
| % Genetron 11SBA Solubility % with increased polyester polyol | | | | | | | | | | |
| (After 4 weeks at 70° F.) | 100 | 100 | 100 | 100 | 90.35 | 84.78 | 83.49 | 74.71 | 55.61 | — |

[1]Trademark of BASF Wyandotte Corp. - rigid foam polyether polyol
[2]Trademark of Hercules Inc. - aromatic polyester polyol
[3]Union Carbide Corp. - silicone surfactant
[4]Trademark of Texaco, Inc. - 33% triethylene diamine in propylene glycol
[5]Texaco, Inc. - N,N—dimethylethanolamine
[6]Metal & Thermit Co. - dibutyltin dilaurate
[7]Trademark of Allied Chemical Co. - a stabilized grade of trichlorofluoromethane (CFC-11) containing a 0.5% of alpha methyl styrene From this example, it is seen that CFC-11 solubility in the rigid urethane foam premix decreased from 100% to 90.4% at a aromatic polyester polyol concentration of 40% of the polyol composition.

EXAMPLE II

Blends of CFC-11 and CFC-123 were prepared based on the equivalents of fluorocarbon blowing agent present in the premix in Example 1, i.e.:

| Fluorocarbon | Equivalent Weight |
|---|---|
| CFC-11 | 137.4 |
| CFC-123 | 153.0 |

Equivalents CFC-11 in premix $= \frac{35}{137.4} = 0.255$

TABLE II

CFC-11/CFC-123 BLENDS

| Blend | CFC-11 Equivalents/gms | CFC-123 Equivalents/gms | Wt. of Blend Used in Premix |
|---|---|---|---|
| 95/5 | 0.242/33.25 | 0.0127/1.95 | 35.2 gms |
| 90/10 | 0.2295/31.53 | 0.0255/3.90 | 35.4 gms |
| 85/15 | 0.2168/29.79 | 0.0382/5.85 | 35.6 gms |
| 80/20 | 0.204/28.03 | 0.051/7.80 | 35.8 gms |

In the premix containing 40% of Terate 203 as part of the polyol in Example 1, 35.2 grams of 95/5 blend of CFC-11/CFC-123 were substituted for 35 grams of CFC-11 and fluorocarbon solubility determined after one month storage at 70° F. No phase separation was observed at the end of the one month period. It is seen from this example that the fluorocarbon solubility increased from 90.4% (CFC-11) to 100% using the 95/5 blend of CFC-11/CFC-123.

EXAMPLE III

Similar equivalent blends of CFC-11/CFC-123a were prepared as in Example 2.

In the premix containing 50% of aromatic polyester polyol (Terate 203) as part of the polyol in Example 1, 35.4 grams of 90/10 blend of CFC-11/CFC-123a were substituted for 35 grams of CFC-11 and fluorocarbon solubility determined after one month storage at 70° F. The fluorocarbon solubility increased from 84.8% (CFC-11) to 100% using the 90/10 blend of CFC-11/CFC-123a.

EXAMPLE IV

Bench-scale rigid urethane foams were prepared from the premix in Example I containing 50% of aromatic polyester polyol as part of the polyol composition using (a) CFC-11, (b) 90/10 blend of CFC-11/CFC-123 and (c) 90/10 blend of CFC-11/CFC-123a. Resultant foam reactivity, appearance and physical properties were compared and are set forth in Table III.

No significant differences in reactivity, appearance or physical properties were observed among bench scale foams prepared with CFC-11, a 90/10 blend of CFC-11/CFC-123 or a 90/10 blend of CFC-11/CFC-123a.

TABLE III

BENCH SCALE RIGID URETHANE FOAMS

| | Parts By Weight | | |
|---|---|---|---|
| | (a) | (b) | (c) |
| Formulation | | | |
| Pluracol 879 | 50 | 50 | 50 |
| Terate 203 | 50 | 50 | 50 |
| Silicone L-5340 | 1.5 | 1.5 | 1.5 |
| Thancat TD-33 | 0.5 | 0.5 | 0.5 |
| Thancat DME | 0.2 | 0.2 | 0.2 |
| Catalyst T-12 | 0.1 | 0.1 | 0.1 |
| Genetron 11 SBA | 35 | — | — |
| 90/10 G-11 SBA*/CFC-123 | — | 35.4 | — |
| 90/10 G-11 SBA*/CFC-123a | — | — | 35.4 |
| Lupranate[1] M-20 at 1.29 Index | 112.2 | 112.2 | 112.2 |
| Reactivity | | | |
| Cream Time, sec. | 10 | 10 | 10 |
| Gel Time, sec. | 30 | 30 | 30 |
| Tack Free Time, sec. | 40 | 40 | 40 |
| Appearance | | | |
| Cell Structure | Fine | Fine | Fine |
| Physical Properties | | | |
| Density, lbs/cu. ft. | 1.75 | 1.72 | 1.81 |
| Compression Load at 10%, psi | | | |
| Parallel to rise | 32.4 | 32.8 | 32.9 |
| Perpendicular to rise | 13.4 | 13.2 | 14.3 |
| Physical Properties | | | |
| Porosity, % closed cells | 96 | 97 | 98 |
| K-Factor, BTU/(Hr) (Sq. Ft.) (°F./in.) | 0.150 | 0.148 | 0.135 |

*Genetron 11SBA
[1]Trademark of BASF Wyandotte Corp. - polymethylene polyphenylisocyanate, functionality 2.7 approx.

EXAMPLE V

Machine-made rigid urethane foams were prepared on a Martin Sweets Co. Modern Module III urethane foam machine at a delivery rate of 12-lbs/minute using the premix system in Example 1 containing 50% Terate 203 as part of the polyol composition using (a) Genetron 11 SBA; (b) a 90/10 blend of Genetron 11 SBA/CFC-123; and (c) a 90/10 blend of Genetron 11 SBA/CFC-123a, as blowing agent compositions.

No significant differeneces in reactivity, appearance or physical properties were observed among machine-made foams produced with CFC-11, 90/10 blend of CFC-11/CFC-123, or a 90/10 blend of CFC-11/CFC-123a as blowing agents.

The data is summarized in Table IV.

TABLE IV

MACHINE MADE RIGID URETHANE FOAMS

| | Parts By Weight | | |
|---|---|---|---|
| | (a) | (b) | (c) |
| Formulation | | | |
| Pluracol 879 | 50 | 50 | 50 |
| Terate 203 | 50 | 50 | 50 |
| Silicone L-5340 | 1.5 | 1.5 | 1.5 |
| Thancat TD-33 | 0.5 | 0.5 | 0.5 |
| Thancat DME | 0.2 | 0.2 | 0.2 |
| Catalyst T-12 | 0.1 | 0.1 | 0.1 |
| Genetron 11 SBA | 35 | — | — |
| 90/10 G-11 SBA/CFC-123 | — | 35.4 | — |
| 90/10 G-11 SBA/CFC-123a | — | — | 35.4 |
| Lupranate M-20 at 1.29 Index | 112.2 | 112.2 | 112.2 |
| Reactivity | | | |
| Cream Time, sec. | 15 | 16 | 17 |
| Gel Time, sec. | 35 | 36 | 35 |
| Tack Free Time, sec. | 55 | 59 | 54 |
| Appearance | | | |
| Cell Structure | Fine | Fine | Fine |
| Physical Properties | | | |
| Density, lbs/cu. ft. | 1.70 | 1.80 | 1.82 |
| Compression Load at 10%, psi | | | |
| Parallel to rise | 34.8 | 30.4 | 28.5 |
| Perpendicular to rise | 12.3 | 12.6 | 13.8 |
| Porosity, % closed cells | 93 | 94 | 95 |
| K-Factor, BTU/(Hr) (Sq. Ft.) (°F./in.) | 0.151 | 0.150 | 0.147 |

From the foregoing, it is thus seen that a rigid urethane foam chemical system can be compounded containing aromatic polyester polyols with fluorocarbon blowing agent blends of CFC-11/CFC-123 or CFC-11/CFC-123a with improved compatibility or solubility properties over long term storage periods. Additionally, the amount of low-cost aromatic polyester polyols which may be introduced into formulations may be increased with no significant effect on fluorocarbon compatibility in the system.

It will be understood from the foregoing that depending on the period of time that the polyurethane foam premix components will be stored before use that the inclusion of a stabilizer in the fluorocarbon component may be advisable, i.e., a stabilized grade may be employed. Stabilization of fluorocarbons is disclosed, for example, in U.S. Pat. No. 3,352,789.

Various modifications to the foregoing will be apparent to one skilled in the art from the disclosure and teaching herein provided such modifications are not to be construed as limiting the invention except to the extent that a given limitation is set forth in the claims which follow.

What is claimed is:

1. A mixture comprising a foamable polyurethane-forming composition reactive with polyisocyanate comprising from about 20 percent to about 80 percent by weight of an aromatic polyester polyol based on the total polyol composition and from about 80 percent to about 20 percent of a polyether polyol, with a fluorocarbon blowing agent comprising a blend of at least one isomer of dichlorotrifluoroethane and trichlorofluoromethane in a ratio of the dichlorotrifluoroethane to trichlorofluoromethane of from about 1:9 to about 3:7 and wherein the total blowing agent is present in amounts of from about 2 to 40 parts by weight based on the weight of the polyol.

2. The mixture of claim 1 wherein the aromatic polyester polyol is present in amounts of from about 30 weight percent to about 80 weight percent.

3. The mixture of claim 1 wherein the aromatic polyester polyol is present in amounts of about 40 to about 50 weight percent.

4. The mixture of claim 1 wherein the blowing agent blend is in a ratio of about 1:4.

5. The mixture of claim 1 wherein the blowing agent incorporates a stabilizer.

6. A rigid polyurethane foam forming composition comprising the reaction product of the mixture of claim 1 with polyisocyanate.

7. A method of producing a rigid polyurethane foam article employing trichlorofluoromethane blowing agent having enhanced solubility in aromatic polyester polyols which comprises:
 (a) blending dichlorodifluoromethane with the trichlorofluoromethane in a ratio of about 1:9 to about 3:7, and in admixture with a foamable urethane composition of about 20 to about 80 percent aromatic polyester polyol, the balance being polyether polyol;
 (b) combining said mixture with a reaction promoting catalyst and emulsifier to provide a premix; and
 (c) mixing the required amount of the above resultant premix with the required amount of isocyanate-containing component to produce a rigid foam article in rigid urethane foam production equipment.

8. The method of claim 7 wherein the foamable polyurethane comprises a premix component containing:
 a blend of 90% trichlorofluoromethane with 10% of a dichlorodifluoromethane.

9. The method of claim 7 wherein the foamable urethane mixture comprises a blend of 60% aromatic polyester polyol with 40% of a conventional rigid urethane foam polyether polyol; and
 (a) a catalyst selected from the group of amine and/or metallic catalysts; and
 (b) a silicone emulsifier.

10. The method of claim 7 wherein the isocyanate containing component is selected from the group consisting of pure or crude toluene diisocyanates, polymethylene polyphenyl isocyanate, or blends of such isocyanates and isocyanate terminated prepolymers made from such isocyanates.

* * * * *